United States Patent Office 2,914,440
Patented Nov. 24, 1959

2,914,440

NEW COMPOSITIONS OF MATTER

William P. Utermohlen, Jr., Arlington Heights, Ill., assignor to Velsicol Chemical Corporation, Chicago, Ill., a corporation of Illinois No Drawing. Application February 13, 1959
Serial No. 792,967

8 Claims. (Cl. 167—30)

This invention relates to new chemical compositions of matter. More specifically, this invention relates to new chemical compounds of the formula

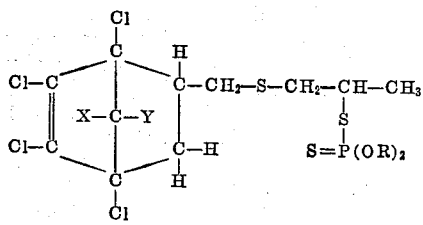

wherein X and Y are selected from the group consisting of chlorine and hydrogen atoms and R is a saturated hydrocarbon radical containing from one to three carbon atoms. These new chemical compounds are useful as pesticides, particularly as insecticides.

These new compounds can be prepared readily by the treatment of the 1:1 adduct of the appropriate chlorinated cyclopentadiene and diallyl sulfide with the O,O-dialkyl phosphorodithioate $HSSP(OR)_2$ (R is as defined above). At least equimolecular proportions of the reactants should be used, but it is desirable to use an excess of the acid. The reaction can be carried out satisfactorily without a solvent, but inert solvents or diluents can be used if desired. The exact temperature at which the reaction is run is not critical, but reaction temperatures in the range from about normal room temperature to about 80° C. are preferred. The addition of a small amount of an oxidation inhibitor such as hydroquinone to the reaction mixture is desirable. When the reaction is complete, the mixture is taken up in a suitable solvent such as an aromatic hydrocarbon and is washed with a dilute aqueous solution of a base such as sodium carbonate to remove any unreacted acid. The solution is then washed with water and dried, and the solvent is distilled off in vacuo. The residue is often sufficiently pure for pesticidal use as such, but if desired this product can be purified by fractional distillation, recrystallization, or other techniques known to those skilled in the art.

The adducts of the chlorinated cyclopentadienes and diallyl sulfide required as starting materials in the preparation of the compounds of this invention are prepared from the sulfide and hexachlorocyclopentadiene (a chemical of commerce), 1,2,3,4,5-pentachlorocyclopentadiene, or 1,2,3,4-tetrachlorocyclopentadiene in the recognized manner. The latter two chlorinated cyclopentadienes can be obtained, for example, by the catalytic hydrogenation of hexachlorocyclopentadiene in the presence of a platinum or palladium catalyst as described by McBee and Smith, J. Am. Chem. Soc. 77, 389 (1955). When hexachlorocyclopentadiene is used as the starting material, both X and Y are chlorine atoms in the final products of this invention. When 1,2,3,4,5-pentachlorocyclopentadiene is used, one of X or Y is a chorine atom and the other is a hydrogen atom. When 1,2,3,4-tetrachlorocyclopentadiene is used, both X and Y are hydrogen atoms.

The reaction between the chlorinated cyclopentadiene and diallyl sulfide is preferably carried out with approximately equal molar ratios of reactants, since an excess of the chlorinated cyclopentadiene may favor formation of the undesired 2:1 adduct. The temperature at which the adduction reaction is carried out is not critical, but temperatures in the range between about 80° and 140° C. are preferred. While the reaction takes place satisfactorily without a solvent, inert solvents or diluents can be employed. The reaction is generally complete in a few hours, and the product can be isolated by distilling off any solvent and fractionating the residue in vacuo.

The manner in which the compounds of this invention can be prepared is illustrated in the following examples.

EXAMPLE 1

*Preparation of the 1:1 adduct of diallyl sulfide and hexachlorocyclopentadiene*

Hexachlorocyclopentadiene (136.34 g.; 0.5 mole) was heated to a temperature of about 130° C. in a 3-necked, round-bottomed flask fitted with a reflux condenser, mechanical stirrer, internal thermometer, and separatory funnel. Diallyl sulfide (57.10 g.; 0.5 mole) was added dropwise with stirring at such a rate as to maintain the temperature at about 130° C. After the sulfide had been added, the mixture was heated at 160° C. for 1 hour. The cooled reaction mixture was then distilled in vacuo. The distillate was refractionated to give the desired adduct having a boiling point of 144–145° C. at 0.3 mm. pressure.

EXAMPLE 2

*Preparation of 2,3,4,5,7,7-hexachloro-1,2,5,6-tetrahydro-2,5-methanobenzyl 2-(O,O-dimethylphosphorodithio)-propyl sulfide*

A mixture of the 1:1 adduct (30 g.; 0.078 mole) of diallyl sulfide and hexachlorocyclopentadiene, O,O-dimethyl phosphorodithioate (16 g.; 0.1 mole), and 0.1 g. of hydroquinone was heated at 65° C. for 17 hours in a round-bottomed flask fitted with a mechanical stirrer, internal thermometer, and reflux condenser. The temperature was then raised to 79° C. for 8 hours. The cooled reaction mixture was dissolved in benzene and washed first with 10% sodium carbonate solution and then with water. The benzene solution was dried over anhydrous sodium sulfate and filtered, after which the benzene was distilled off in vacuo, first with a water aspirator and then with a mechanical vacuum pump. The brown residue was filtered through Super-Cel (a diatomaceous silica filtering aid) to give 28 g. of 2,3,-4,5,7,7 - hexachloro - 1,2,5,6 - tetrahydro - 2,5 - methanobenzyl 2 - (O,O - dimethylphosphorodithio) - propyl sulfide, a viscous oil having an index of refraction (D line) at 24° C. of 1.5746.

Analysis for $C_{13}H_{17}Cl_6O_2PS_3$: Theory—Cl, 39.03%; P, 5.69%; S, 17.65%. Found—Cl, 40.03%; P, 5.23%; S, 17.01%.

Other compounds which fall within the scope of this invention can be prepared in the manner detailed above. In the following examples are given the required O,O-dialkyl phosphorodithioate to be used in the reaction with the 1:1 chlorinated cyclopentadiene-diallyl sulfide adduct to give the named compounds of this invention. For brevity, the adducts of diallyl sulfide with hexachloro-, 1,2,3,4,5-pentachloro-, and 1,2,3,4-tetrachlorocyclopentadiene are referred to as A, B, and C, respectively.

EXAMPLE 3

O,O - dimethyl phosphorodithioate+B=2,3,4,5,7-pentachloro - 1,2,5,6 - tetrahydro - 2,5 - methanobenzyl 2-(O,O-dimethylphosphorodithio)propyl sulfide.

EXAMPLE 4

O,O - dimethyl phosphorodithioate + C=2,3,4,5-tetrachloro-1,2,5,6-tetrahydro-2,5-methanobenzyl 2-(O,O-dimethylphosphorodithio)propyl sulfide.

EXAMPLE 5

O,O - diethyl phosphorodithioate + A=2,3,4,5,7,7-hexachloro - 1,2,5,6 - tetrahydro - 2,5 - methanobenzyl 2-(O,O-diethylphosphorodithio)propyl sulfide.

EXAMPLE 6

O,O - diethyl phosphorodithioate+B=2,3,4,5,7-pentachloro - 1,2,5,6 - tetrahydro - 2,5 - methanobenzyl 2 - (O,O-diethylphosphorodithio)propyl sulfide.

EXAMPLE 7

O,O - diethyl phosphorodithioate+C=2,3,4,5 - tetrachloro - 1,2,5,6 - tetrahydro - 2,5 - methanobenzyl 2-(O,O-diethylphosphorodithio)propyl sulfide.

EXAMPLE 8

O,O-di-n-propyl phosphorodithioate+A=2,3,4,5,7,7-hexachloro - 1,2,5,6 - tetrahydro - 2,5 - methanobenzyl 2-(O,O-di-n-propylphosphorodithio)propyl sulfide.

EXAMPLE 9

O,O-di-n-propyl phosphorodithioate+B=2,3,4,5,7-pentachloro - 1,2,5,6 - tetrahydro - 2,5 - methanobenzyl 2-(O,O-di-n-propylphosphorodithio)propyl sulfide.

EXAMPLE 10

O,O-di-n-propyl phosphorodithioate+C=2,3,4,5-tetrachloro - 1,2,5,6 - tetrahydro - 2,5 - methanobenzyl 2-(O,O-di-n-propylphosphorodithio)propyl sulfide.

EXAMPLE 11

O,O-diisopropyl phosphorodithioate+A=2,3,4,5,7,7-hexachloro - 1,2,5,6 - tetrahydro - 2,5-methanobenzyl 2-(O,O-diisopropylphosphorodithio)propyl sulfide.

The toxicity of the compounds of this invention was illustrated, for example, by experiments in which test compounds were formulated as wettable powder concentrates by adding them to an inert carrier and grinding to a uniform blend on a ball mill. Respective formulations were then diluted in water to concentrations of actual chemical desired. Cranberry bean plants were dipped in appropriate concentrations of the respective formulations and allowed to dry. Third instar larvae of the southern armyworm (Prodenia eridania) were then caged on the treated plants and maintained under greenhouse conditions for 48 hours, following which observations of mortality, plant injury, and percent feeding were made. Three replicates were used for each level of application. In these experiments, the product of Example 2 used at a concentration of 0.025% gave 100% mortality of the test subjects, no plant injury, and no feeding on the plants. An untreated control showed no mortality and 100% feeding.

Experiments were also carried out for residual toxicity to houseflies in which 2 ml. of acetone solutions of test chemicals were applied to a 125 mm. filter paper. After the solvent had volatilized, houseflies were caged in hemispherical wire cages over the treated filter paper for a total of 24 hours and were observed for mortality. Three replicates were used for each level of application. In these experiments, the product of Example 2 used at a concentration of 1.0% gave 100% mortality of the flies in 20 hours, while there was no mortality in an untreated control.

Experiments were also carried out for the systematic control of aphids by root absorption and translocation. Test compounds were dissolved in acetone and dispersed in distilled water at various concentrations. Host plants, infested with adults of the pea aphid (Macrosiphum pisi), were uprooted, washed free of soil, and placed in glass jars containing 100 cc. of the dispersed test compound. Aluminum foil was placed around the plant stem and jar to reduce possible escape of toxic vapors from the test dispersion. The test plants were maintained in the greenhouse for 72 hours and then observed for systemic aphicidal effectiveness. Three replicates were used for each treatment. In these experiments, the product of Example 2 used at a concentration of 100 p.p.m. gave 100% mortality of the aphids with no plant injury, while there was no mortality in an untreated control.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalene sulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizer, activators, adhesives, spreaders, and synergists can be added to these formulations if desired. The manner in which typical pesticidal com-

EXAMPLE 12

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| 2,3,4,5,7,7 - hexachloro - 1,2,5,6 - tetrahydro - 2,5-methanobenzyl 2 - (O,O - dimethylphosphorodithio)-propyl sulfide | 25 |
| Sodium lauryl sulfate | 2 |
| Sodium lignin sulfonate | 3 |
| Kerosene | 70 |

EXAMPLE 13

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| 2,3,4,5,7,7 - hexachloro - 1,2,5,6 - tetrahydro - 2,5-methanobenzyl 2 - (O,O - diethylphosphorodithio)-propyl sulfide | 75.00 |
| Fuller's earth | 22.75 |
| Sodium lauryl sulfate | 2.00 |
| Methyl cellulose | .25 |

EXAMPLE 14

*Preparation of an oil-dispersible powder*

The following components are blended and ground as described in the previous example to give a powder which can be dispersed in oil to form a spray containing the desired concentration of active compound.

| | |
|---|---|
| 2,3,4,5,7,7 - hexachloro - 1,2,5,6 - tetrahydro - 2,5-methanobenzyl 2 - (O,O - di - n - propylphosphorodithio)-propyl sulfide | 70 |
| Condensation product of diamylphenol with ethylene oxide | 4 |
| Fuller's earth | 26 |

EXAMPLE 15

*Preparation of a dust*

The following ingredients are mixed thoroughly and then ground to an average particle size of less than about 50 microns to give a dust suitable for application with conventional dusting equipment.

| | |
|---|---|
| 2,3,4,5,7 - pentachloro - 1,2,5,6 - tetrahydro-2,5-methanobenzyl 2 - (O,O - dimethylphosphorodithio)-propyl sulfide | 20 |
| Talc | 80 |

EXAMPLE 16

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| 2,3,4,5 - tetrachloro - 1,2,5,6 - tetrahydro - 2,5 - methanobenzyl 2 - (O,O - dimethylphosphorodithio)-propyl sulfide | 10 |
| Fuller's earth | 66 |
| Dextrin | 20 |
| Sodium lignin sulfonate | 3 |
| Kerosene | 1 |

I claim:

1. A compound of the formula $$\begin{array}{c} Cl \\ | \\ Cl-C \diagup \overset{C}{\underset{X-C-Y}{|}} \diagdown \overset{H}{\underset{|}{C}}-CH_2-S-CH_2-CH-CH_3 \\ Cl-C \diagdown \underset{|}{\underset{Cl}{C}} \diagup \overset{|}{\underset{H}{C}}-H \qquad S=P(OR)_2 \end{array}$$

wherein X and Y are selected from the group consisting of chlorine and hydrogen atoms and R is a saturated hydrocarbon radical containing from 1 to 3 carbon atoms.

2. 2,3,4,5,7,7 - hexachloro - 1,2,5,6 - tetrahydro - 2,5-methanobenzyl 2-(O,O-dimethylphosphorodithio)propyl sulfide.

3. 2,3,4,5,7,7 - hexachloro - 1,2,5,6 - tetrahydro-2,5-methanobenzyl 2-(O,O - diethylphosphorodithio)propyl sulfide.

4. 2,3,4,5,7,7 - hexachloro - 1,2,5,6 - tetrahydro - 2,5-methanobenzyl 2 - (O,O - di - n - propylphosphorodithio)-propyl sulfide.

5. 2,3,4,5,7 - pentachloro - 1,2,5,6 - tetrahydro - 2,5-methanobenzyl 2 - (O,O - dimethylphosphorodithio)-propyl sulfide.

6. 2,3,4,5 - tetrachloro - 1,2,5,6 - tetrahydro - 2,5-methanobenzyl 2 - (O,O - dimethylphosphorodithio)-propyl sulfide.

7. An insecticidal composition comprising an inert carrier and a toxic amount of a compound of claim 1.

8. A method of destroying undesirable insects which comprises contacting said insects with an insecticidal composition comprising an inert carrier and as the essential active ingredient, in a quantity which is injurious to said insects, a compound of claim 1.

No references cited.

UNITED STATES PATENT OFFICE
CERTIFICATE OF CORRECTION

Patent No. 2,914,440            November 24, 1959

William P. Utermohlen, Jr.

It is hereby certified that error appears in the printed specification of the above numbered patent requiring correction and that the said Letters Patent should read as corrected below.

Column 3, line 75, for "systematic" read -- systemic --.

Signed and sealed this 17th day of May 1960.

(SEAL)
Attest:

KARL H. AXLINE
Attesting Officer

ROBERT C. WATSON
Commissioner of Patents